(12) United States Patent
Bachman et al.

(10) Patent No.: US 7,065,536 B2
(45) Date of Patent: Jun. 20, 2006

(54) AUTOMATED MAINTENANCE OF AN ELECTRONIC DATABASE VIA A POINT SYSTEM IMPLEMENTATION

(75) Inventors: Robert Edward Bachman, Ridgefield, CT (US); Richard Dale Hoffman, Austin, TX (US); Verlyn Mark Johnson, Wykoff, MN (US); Douglas Warren McDavid, Elk Grove, CA (US); Dorothy Irene Mazina, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/334,280

(22) Filed: Dec. 31, 2002

(65) Prior Publication Data

US 2004/0128270 A1 Jul. 1, 2004

(51) Int. Cl.
*G06F 17/30* (2006.01)
(52) U.S. Cl. .................. 707/200; 707/203; 709/206
(58) Field of Classification Search ................ None
See application file for complete search history.

(56) References Cited

U.S. PATENT DOCUMENTS

| | | | |
|---|---|---|---|
| 6,076,101 A * | 6/2000 | Kamakura et al. | 709/206 |
| 2002/0059228 A1* | 5/2002 | McCall et al. | 707/6 |
| 2003/0018659 A1* | 1/2003 | Fuks et al. | 707/500 |
| 2003/0204536 A1* | 10/2003 | Keskar et al. | 707/200 |
| 2004/0019846 A1* | 1/2004 | Castellani et al. | 715/500 |
| 2005/0119922 A1* | 6/2005 | Eder | 705/7 |

OTHER PUBLICATIONS

Pramudiono, Iko, et al., *User Behavior Analysis of Location Aware Search Engine*, Proceedings of the Third International Conference on Mobile Data Management *IEEE*, 2002, pp. 1-7.
Said Mirza Pahlevi and Hiroyuki Kitagawa, *Taxonomy-based Adaptive Web Search Method*, Proceedings of the International Conference on Information Technology: Coding and Computing *IEEE*, 2002.

* cited by examiner

*Primary Examiner*—Jeffery Gaffin
*Assistant Examiner*—Hassan Mahmoudi
(74) *Attorney, Agent, or Firm*—Leslie A. VanLeeuwen; Dillon & Yudell LLP

(57) ABSTRACT

A method for real-time automated maintenance of an electronic database. A value parameter is associated with each data component. The use history of each of the individual data components is tracked using the value parameter. A set number of points is assigned to each data component each time the component is retrieved in response to a user-entered search request. The set number of points is added to the value parameter. A minimum threshold value is established and at pre-determine time intervals a check is made to determine if any data component within the database fails to accumulate at least a minimum threshold number of points. Data components that have not accumulated the minimum number of points are removed from the database. When a new data component is added to the database, a default point value is assigned to the value parameter of the new component.

20 Claims, 19 Drawing Sheets

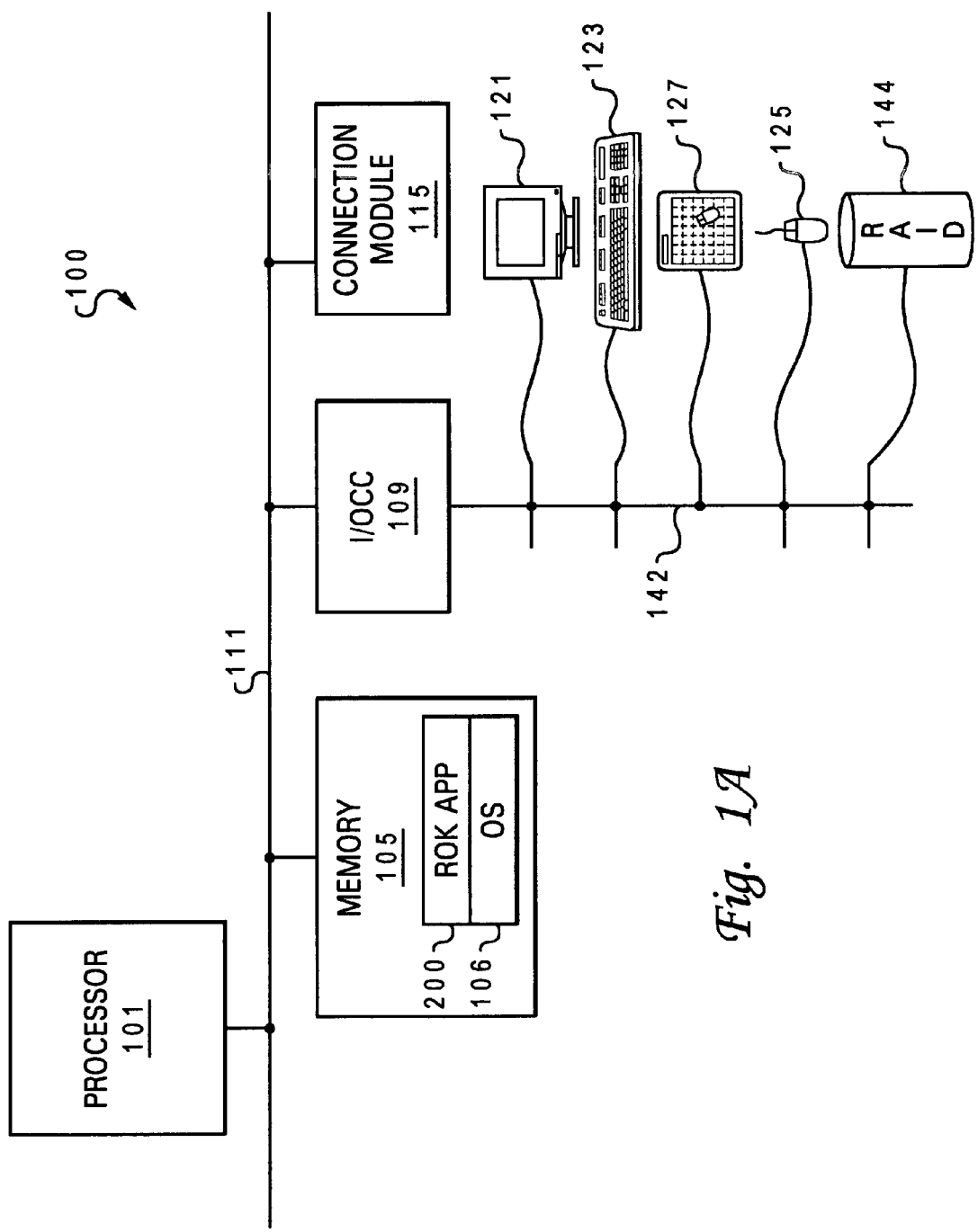

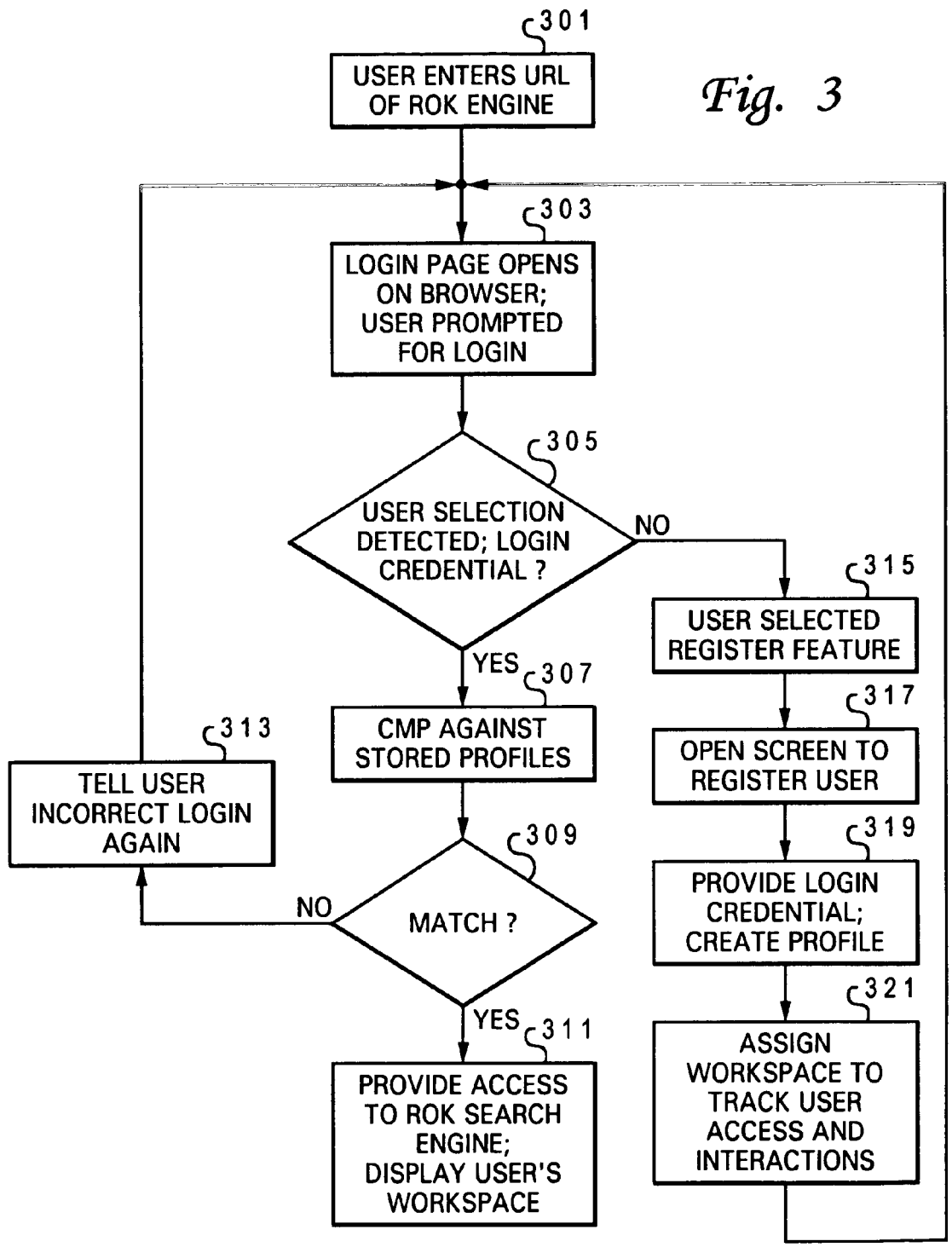

ROK for John Doe

Please choose the goal you want to work on:

| Current Goals & Objectives | Date Started | Steps |
|---|---|---|
| Connecting to an ODBC database | 12-Jan-2002 | 4/8 |
| Diagnosing a problem from a WebSphere trace | 03-Jan-2002 | 0/25 |
| PROJECT: Collaboration (P2P) + RUP + Architect | 20-Jan-2002 | 2/7 |
| BUILD RECIPE: Working with WebLogic Legacy | 31-Jan-2002 | |

NEW OBJECTIVE    NEW GOAL    DISCARD

GO

Tool Help
this tool
this page

HISTORY    EXIT

ROK for John Doe

Choose a pattern, method and a role. Use the "?" button for explanations of selected items.

e-business Pattern
- Self-Service
- Collaboration
- Information Aggregation
- Extended Enterprise
- Access Integration
- Application Integration Method
- RUP
- GSMethod Role
- Architect
- Architecture Reviewer
- Business Designer
- Business Model Reviewer
- Business-Process Analyst Choose an application pattern for Collaboration:
- Point-to-Point
- Store and Retrieve
- Managed Collaboration

GO ?

Tool Help
- this tool
- this page

ROK for John Doe

Choose the design elements to be included in your application:

- ▸ Model the business — ? Disable
  - Assess Business Status — ? Enable
  - Describe Current Business — ? Enable
  - Identify Business Processes — ? Disable
  - Refine Business Processes — ? Disable
  - Design Business Process Realizations — ? Disable
  - Refine Roles and Responsibilities — ? Disable
  - Explore Process Automation — ? Enable
  - Domain Modeling — ? Disable
- ▸ Gather Requirements — ? Disable
- ▸ Analyze and Design — ? Disable
- ▸ Implement — ? Enable
- ▸ Deploy — ? Enable (GO)

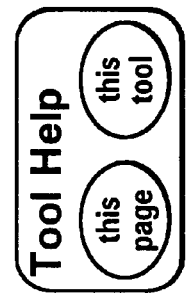

Tool Help
(this page) (this tool)

*Fig. 4C*

ROK for John Doe

Please choose the tasks that most closely match your objective:

```
Connecting to an ODBC database
Connecting to a DB2 database
Connecting to Encina-based services
```

(GO) *no matching tasks*

Tool Help
(this page) (this tool)

*Fig. 4F*

ROK for John Doe

PROJECT: Collaboration (P2P) + RUP + Architect
STEP: Analysis and Design

Preconditions:
   Precondition 1
   Precondition 2
   ...

Instructions:
   Instruction 1
   Instruction 2
   ...

Postconditions:
   Postcondition 1
   Postcondition 2
   ...

In Case of Failure:
   Diagnostic 1
   Diagnostic 2
   ...

Contact Support (GO) (CUSTOMIZE) (EXIT)

Tool Help: (this page) (this tool)

ROK for John Doe

PROJECT: Collaboration (P2P) + RUP + Architect

<u>Overview</u>

Complete the following tasks in order. Grayed out steps have already been completed.

Step 1: Understand the Collaboration Pattern
Step 2: Understand the Application Pattern
Step 3: Model the Business
Step 4: Gather Requirements
Step 5: Analyze and Design
Step 6: Implement
Step 7: Deploy

GO    CUSTOMIZE    EXIT

Tool Help
this page    this tool

Fig. 4H

ROK for John Doe

We are recording that you were unable to find suitable information for the objective "connect WebSphere Application to Encina-based transactional system". Enter any additional information (e.g., synonyms, sources, contacts, etc.) below:

(GO)

Tool Help
(this tool)
(this page)

491

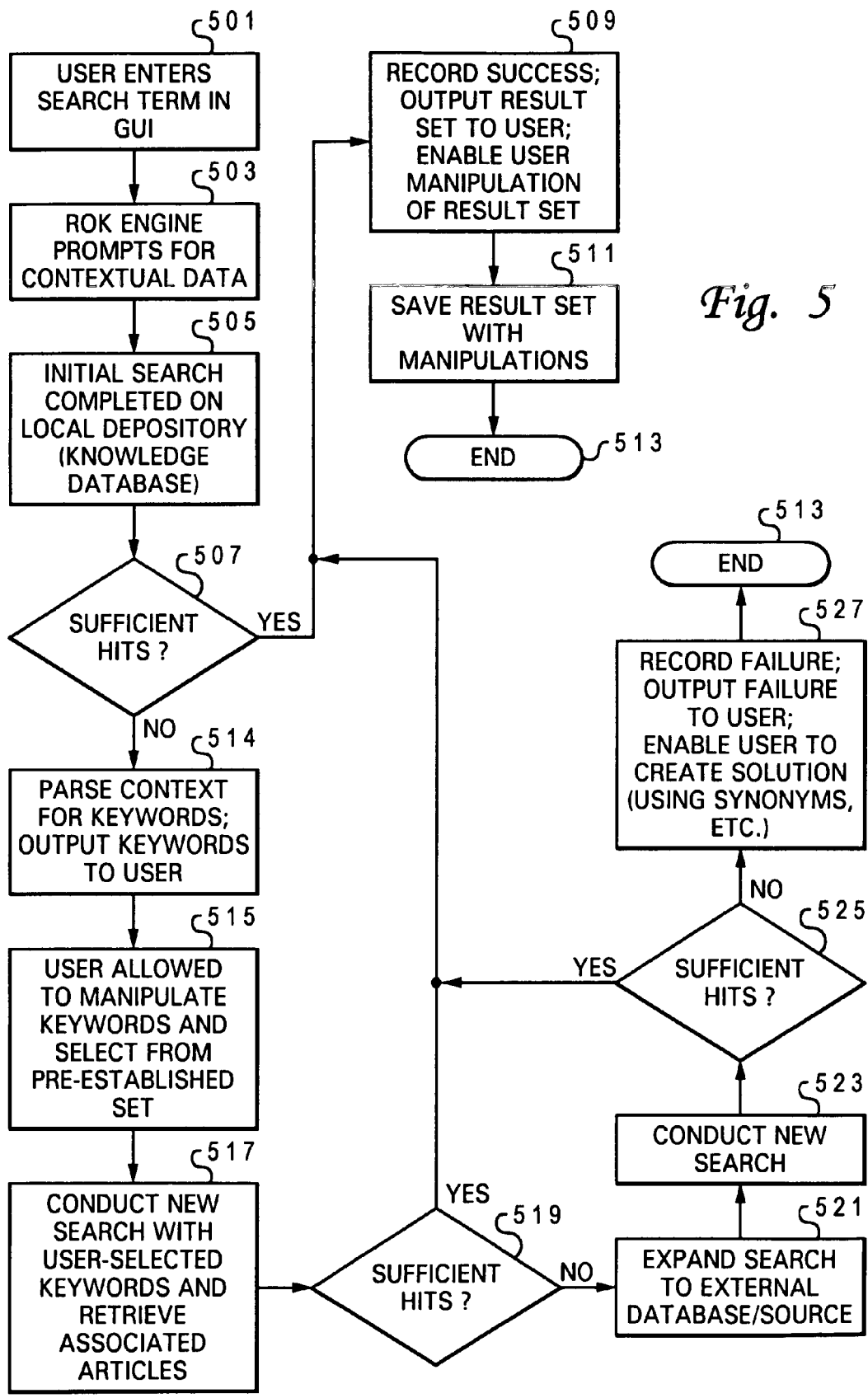

KNOWLEDGE DATABASE 771

| 775 | |
|---|---|
| KEYWORD/TAGS 777 | RECIPE 1 773 |
| KEYWORD/TAGS 777 | RECIPE 2 773 |
| KEYWORD/TAGS 777 | RECIPE 3 773 |
| KEYWORD/TAGS 777 | RECIPE 4 773 |
| KEYWORD/TAGS 777 | RECIPE 5 773 |
| KEYWORD/TAGS 777 | RECIPE 6 773 |
| ... | ... |
| KEYWORD/TAGS 777 | RECIPE N 773 |

*Fig. 7A*

AUTOMATED MAINTENANCE OF AN ELECTRONIC DATABASE VIA A POINT SYSTEM IMPLEMENTATION

RELATED PATENT APPLICATION

The present patent application shares specification text and figures with the following co-pending applications, which were filed concurrently with the present application: application Ser. No. 10/334,256 "Dyamically Updating A Search Engine's Knowledge and Process Database By Tracking and Saving User Interactions;"and application Ser. No. 10/334,255 "Search Engine Facility With Automated Knowledge Retrieval, Generation And Maintenance." The contents of the co-pending applications are incorporated herein by reference.

BACKGROUND OF THE INVENTION

1. Technical Field

The present invention relates to search engines and in particular to document retrieval with search engines on a data processing system. Still more particularly, the present invention relates to a method and system for implementing precise document retrieval via a search engine that provides contextual and weighted keyword searches.

The present invention relates to search engines and in particular to user interaction with search engines on a data processing system. Still more particularly, the present invention relates to a method and system for dynamic, real-time upgrading of the knowledge database of search engines by tracking user interactions.

The present invention relates to electronic databases and in particular to maintenance of content on electronic databases. Still more particularly, the present invention relates to a method and system for automated maintenance of an electronic database via a point system.

2. Description of the Related Art

Computer-based (electronic) search engines are well known in the art. Typically a search engine comprises a software application that is executed on a data processing system and includes a user interface and a database (or repository) of information that is stored on a memory component associated to or accessible by the data processing system. The information (data, documents, articles, etc.) within the database is made accessible to a user via the user interface and input/output (I/O) devices of the data processing system. Utilizing the I/O devices (e.g., keyboard, mouse, and/or touch pad), the user enters a search query in the user interface and submits the query to the search engine/application for processing. The search engines parses the query (if a phrase) into search keys and use those keys to access a set of keywords associated with various articles which can be retrieved.

When the query is received, the search engine compares the search terms (i.e., keywords or tags identified from the query) with the keywords within articles in the database and determines whether the entered search terms match (or are found within) any of the documents within the database. When a match is found, a list of the documents that matches the search terms is returned/outputted to the user. The returned list is typically presented without any structure.

Typically, a user's query is in the form of a text string, which may comprise of a combination of letters and/or numbers. Other characters may also be possible in more complex search engines. The items searched and returned from the database are articles (or electronic documents) or links associated with specific articles (or electronic documents). Some search engines are designed to provide exact matches of the text string in the query or near matches of the text string that are found in these articles. Traditionally, search engines returned any article containing a keyword (or phrase) that is found anywhere (i.e., at any level/section) within the document. However, many advanced search engines return articles which match at a specific level of the document (e.g., title or abstract, etc.). For example, a search for "computer" may provide a return of thousands of articles having either the exact term, computer, or documents with variations of that term, such as computing and compute, or documents with known synonyms such as processors, data processing systems, etc. More modern search engines typically narrow the result of a search query to include only those terms that are at or above a certain level of the article so that the returned articles at least have some relation to the search term provided. Despite this narrowing of searches based on the level at which the search is conducted, however, search engines are unable to always return items of relevance to the specific context in which the user is interested. Also, a specific term may not be tagged with an associated keyword to yield a hit within the database being searched by the search engine.

There are several other limitations with present search engines and the methods by which databases being accessed by these search engines provide data to the requester. For example, current search engines, particularly those with access to a large amount of information such as the Internet, often return a long list of search results containing a lot of noise documents. "Junk results" often greatly out-number the results that a user is interested in, and the results of interest are occasionally embedded deep within the list of provided results. From the user's perspective, the results of such searches often are too large to investigate, while at the same time the results do not contain enough relevant documents to be useful. Most users are only willing to look at the first few tens of results. Further, no assistance is given by the search engine to help the user understand how the documents relate to each other, or to the task that the user is trying to accomplish. Thus, the results of such searches are often unusable because hundreds of articles are returned but the type of information presented in each article is unspecified.

Because of the nature of results received from the publicly accessible (e.g., Internet) search engines, which provides general, non-specific, and un-organized information about many different topics, commercial databases and associated search engines have been designed for utilization within a specific subject area or industry. Searches conducted by these search engines within these commercial databases often provide an arrangement of information designed to train individuals working in that particular industry. As with public accessible databases, however, the number of documents in the commercially available databases continually increases by many orders of magnitude, and the number of irrelevant hits to each search has increased. As the size of the database of archived documents grows, search tools are needed that provide initially more accurate result sets (i.e., return of only a number of truly relevant documents to the user). The notion of "relevant" should only include the very best documents since there may be tens of thousands of slightly relevant documents.

Another limitation with existing search engines involves the inability of the search engine to improve its search features for a particular topic/search term that is searched for by multiple users on a recurring basis. This limitation is very visible with Internet-based search engines. Typically, Internet-based search engines provide a user with a list of potentially relevant articles. The user is left to work back and forth between the articles using browser navigation capabilities and book-marking useful articles. This procedure is often tedious and inefficient. When the user finishes the browser session and closes the window, the results of the user's search and interactions with the search results (bookmarks, etc.) are discarded. Any comments or thoughts the user might have had about the article are lost unless recorded in some other application or medium. Thus, when a next (or the same) user later completes the same search, that next user is forced to go through the tedious tasks of working back and forth through the list of articles and book-marking useful articles. Thus, if a first user's query of a term receives 200 hits only 5 of which are relevant in the particular context desired by the user, a next user with the same query in the same context will also receive the same 200 hits and have to manually work through the 200 hits to find the 5 relevant documents even when the 5 documents were previously identified by the first user.

Notably, depending on the search engine, the same search made at another time may not provide the same result set and may actually exclude articles of relevance to the topic being researched that are not identified by the search term. Although some search engines provide a user with a way to enter textual feedback, this feedback must be manually processed by system administrative personnel. Also, there is no way to maintain and update a database of information utilized by the search engine without substantial manual effort by system administrative personnel. Thus, there is currently no way for a user to provide context information that will enable the search engine to provide more accurate/relevant results. There is also no way for the search engine to utilize the results of a prior search and the efforts of one user to narrow the results to include truly relevant data so that the effort required by a later user requesting the same information is substantially reduced.

The present invention recognizes the limitations of present search engines in providing accurate/relevant results to searches being requested by users, and the invention provides a method and system for improving the relevance of results obtained by a search engine by learning utilizing a combination of search terms along with user-entered context information and user-selected keywords. The invention further provides a method and system for utilizing previous user searches to provide more accurate results to later user-entered queries. These and other benefits are provided by the invention described herein.

The present invention recognizes the limitations of present search engines in providing more efficient and complete solutions to user-entered search inquiries, and the invention provides a method and system for constantly improving a search engine's result producing facility by learning as each user refines his/her search and creates a solution within a user-specified context. The invention further provides a method and system for tracking user interactions with the search engine that are still being refined by a specific user and saving completed solutions to the database for access by other users. Also, the invention recognizes that it would be beneficial to automatically purge the database of information that is rarely utilized or obsolete based on a history of user interactions with the search engine. These and other benefits are provided by the invention described herein.

The present invention recognizes the limitations of manually maintaining an extensive database of information as is currently done, and the invention provides an automated method for maintaining databases utilizing a point system. The invention further provides a method and system by which users of a database are encouraged to add valuable information to the database as the database is being utilized by the users. These and other benefits are provided by the invention described herein.

SUMMARY OF THE INVENTION

Disclosed is a method for real-time automated maintenance of an electronic database. A value parameter is associated with each individual data component within the database. The use history of each of the individual data components is tracked using the value parameter. A set number of points is assigned to each data component each time the component is retrieved in response to a user-entered search request. The set number of points is added to the total within the value parameter. A minimum threshold value is established and at every pre-determine time interval a check is made to determine if any data component within the database fails to accumulate at least a minimum threshold number of points over the time interval. Data components that have not accumulated the minimum number of points are removed from the database. The method further enables a user to generate new data components by interacting with a return on knowledge facility associated with the database. The new data component is added to the database and a default point value is assigned to the value parameter of the new component.

In one embodiment, when a component is retrieved, a range of points that may be selectively assigned to the retrieved component are displayed to the user. The range of points represents the usefulness of the component to the user and ranging from no use to very useful. The user is allowed to select a point value from within the range to assign to the retrieved component. The point parameter of the retrieved component is updated on the knowledge database with the user-selected point value.

In another embodiment, when a point value of a component added by a particular user reaches a maximum threshold value, the user is provided with a reward for authoring and adding the component to the database.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1A is a block diagram illustrating a data processing system with which one embodiment of the invention may be implemented;

FIG. 3 is a flow diagram illustrating user profile set up and work space allocation in accordance with one illustrative embodiment of the present invention;

FIGS. 4A–4I are block diagrams illustrating a sequence of user-interfaces displayed to a user to enable the various user selections completed during implementation of one embodiment of the present invention;

FIG. 5 is a flow chart illustrating the process involved in performing a contextual-based user search within the engine of FIG. 2 according to one embodiment of the present invention;

FIG. 7A is a block diagram of a recipes within a database that includes value parameters by which the database may complete automated maintenance according to one embodiment of the invention.

DETAILED DESCRIPTION OF AN ILLUSTRATIVE EMBODIMENT

The present invention introduces a software-implemented, user-enhanced and upgraded search engine referred to herein as a Return on Knowledge (ROK) engine. Specifically, the invention comprises two sequences of operations completed by a user interacting with the ROK engine (described in Sections I and II, respectively) and an automated maintenance operation performed on the database by the ROK engine (described in Section III).

Figure 2A:
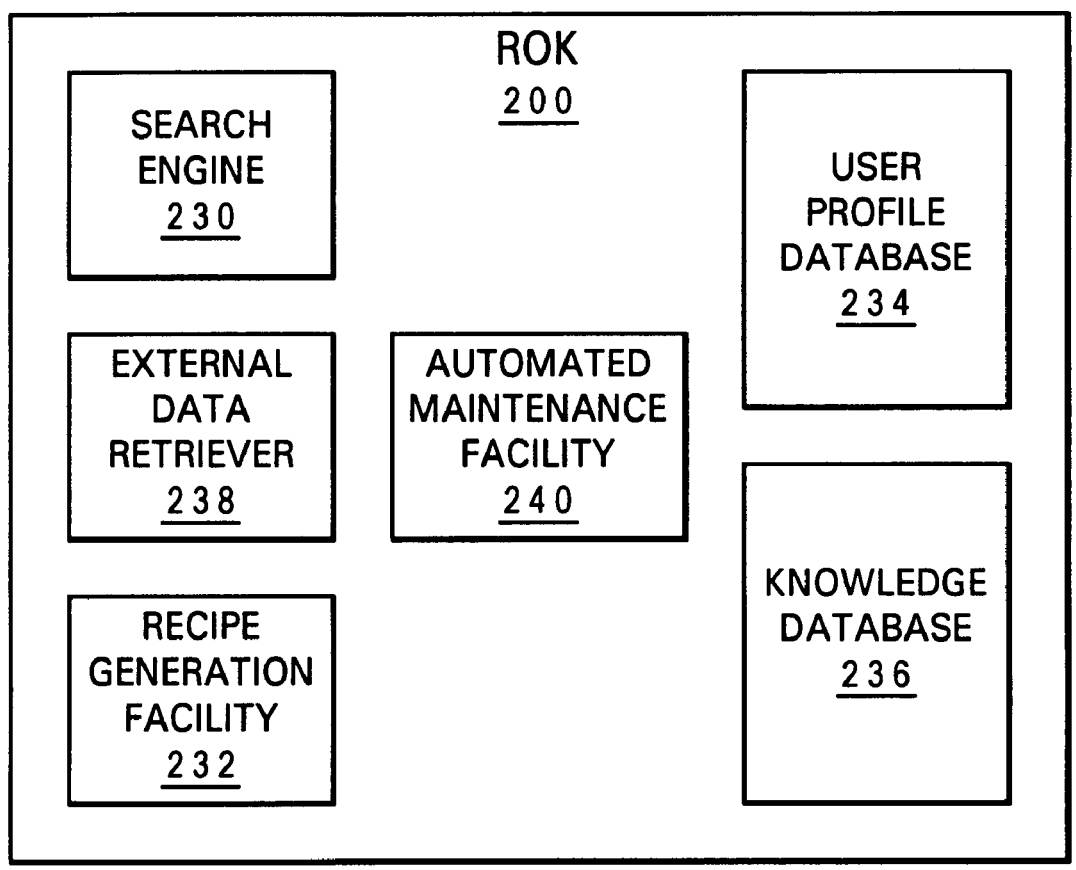
FIG. 2A is a block diagram depicting the major functional blocks of the engine provided according to one embodiment of the invention.

The ROK engine includes user-interactive component(s) and a storage facility (referred to herein as a knowledge database or repository) within which data (i.e., search documents, articles, solutions/recipes, etc.) are maintained and constantly updated in response to the various user-interactions. A more detailed illustrative embodiment of ROK engine 200 is described below in reference to FIG. 2B. A very general description of the ROK engine with its main components is illustrated by FIG. 2A. As shown, ROK engine 200 comprises ROK search engine 230, ROK recipe generation facility 232, user profile database 234, knowledge database 236, external data retriever 238, and automated maintenance facility 240.

The first of the two sequences of operations provided by the invention is an adaptive search engine (referred to hereinafter as ROK search engine 230) with advanced context and keyword searching capabilities. Included within the ROK search engine implementation are the following capabilities:

(1) Enabling contextual searches and user-selected keyword searches;
 (2) Automatic expansion of search area beyond "local" database for missed searches;
 (3) Enabling a combination of contextual searches with both keywords and tags; and
 (4) Naming and saving of search results for later access by a user.

The second of the two sequences of operations is the generation of recipes as solutions to user-entered goals via user-interaction with ROK engine 200 and real-time updating of a knowledge database of ROK engine 200 with the recipes. This operation sequence of involves:

(1) Establishing user work space and security login;
 (2) Describing tasks according to a goal and objective paradigm;
 (3) Providing a reward/incentive to encourage user interaction;
 (4) Generating recipes in real time as solutions for accomplishing user goals and objectives based on user inputs; and
 (5) Saving recipes within the knowledge database to utilize as solutions for future user requests.

I. Hardware and Network Components

Figure 1B:
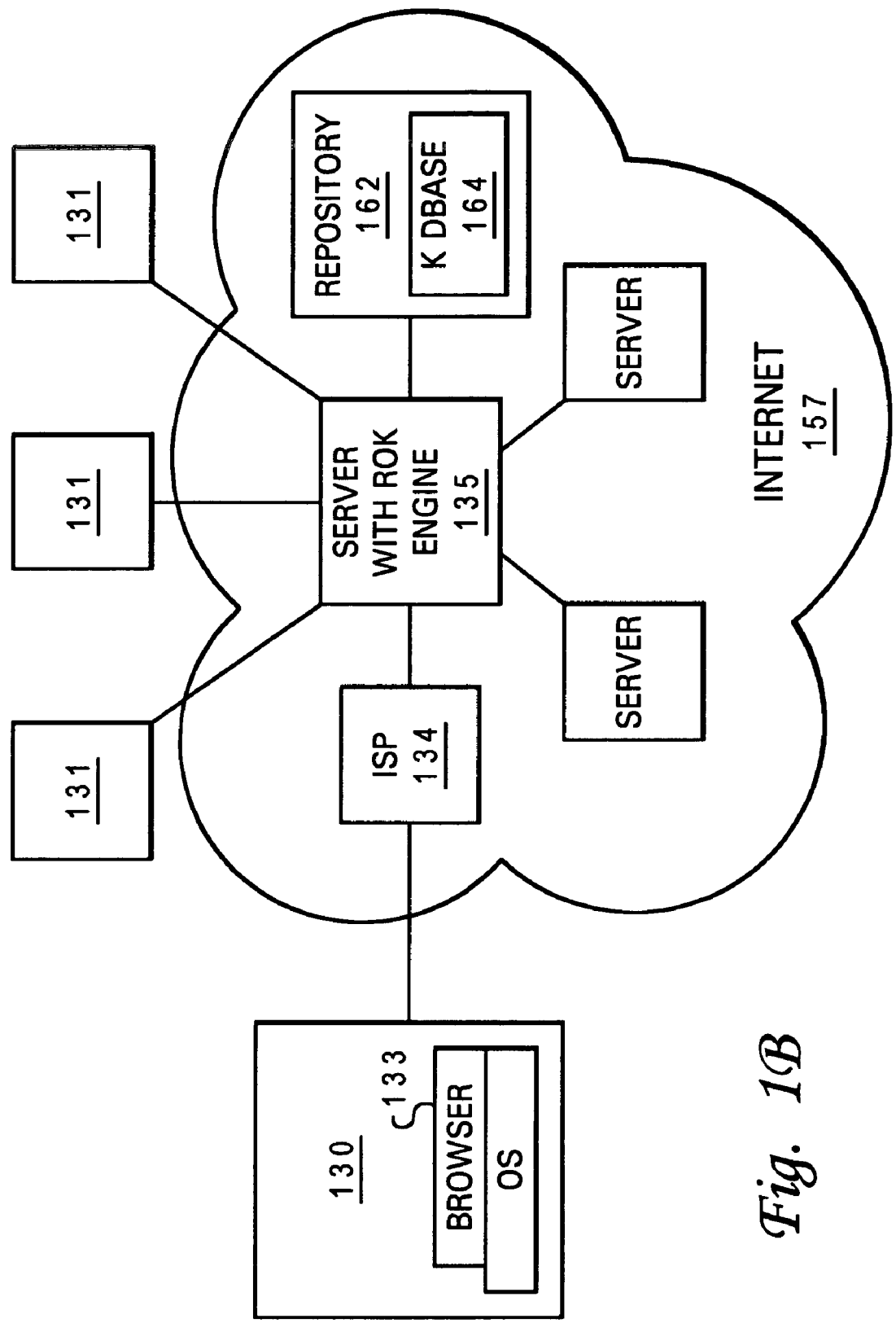
FIG. 1B illustrates a network comprising at least one data processing system with access to a database and/or repository of articles that can be searched and/or updated in real-time in accordance with one illustrative embodiment of the present invention.

With reference now to the figures and in particular FIG. 1A, there is illustrated a data processing system within which the features of the present invention may advantageously be implemented. As shown, data processing system 100 comprises processor 101, which is coupled to memory 105 and Input Output (I/O) Channel Controller (CC) 109 via interconnect 111. Interconnect 111 may comprise a single bus, multiples buses, or a switch. IOCC 109 provides connection via switch 142 to I/O devices including Redundant Array of Independent Disks (RAID) 144, which, in one embodiment, stores the knowledge database that supports the search and other features of the invention as described below. Data processing system 100 also comprises external network connection module 115 (e.g., modem, Ethernet card, etc.) by which data processing system 100 may connect to outside networks as illustrated in FIG. 1B which is described below.

Memory 105 is illustrated with two internal software modules/applications, namely operating system (OS) 106 and Return on Knowledge (ROK) engine 200. On power-on of data processing system 100, OS (and ROK engine 200 in the present embodiment) is loaded into memory 105 and remain resident in memory 105 for execution by processor 101.

ROK engine 200 comprises various functional components described above in FIG. 2A, key among which includes ROK search engine 230 and knowledge database 236. During execution by processor 101, ROK engine 200 outputs a series of user-interactive screens (or graphical user interfaces (GUI)) on video output device (or monitor) 121, which allows a user to interact with the application and view the responses to the inputs/selections as they are made. ROK engine 200 receives the user inputs via one or more input devices, including mouse 125, keyboard 123, or touch pad 127. The functionality of ROK engine 200, including the requests/prompts for and responses to user interactions, are further described below with reference to the remaining figures.

Data processing system 100 is presented as a stand-alone system, which includes all the components required for implementation of ROK engine 200 and key features of the invention. However, as will become clearer below, several features of the invention requires access to a larger network of data (i.e., a larger search than knowledge database 236) as well as global access to a ROK facility (i.e., a system implementing ROK engine 200 with access to the repository of information). For example, when a search on the local knowledge database misses, the invention provides an automated way for ROK search engine to extend the searchable area to include other databases or sources of information such as the Internet (or world wide web). Also, ROK engine 200 may be made available to multiple users by hosting the ROK engine on a server (or system) that is accessible from multiple user machines (or clients) via remote login.

FIG. 1B illustrates a network within which external searches for a user-entered query utilizing the search engine functionality of ROK engine 200 may be completed. Network 151 is linked to at least one data processing system configured similarly to data processing system 100 of FIG. 1A. As illustrated in FIG. 1B, data processing system 100 is coupled to server 153 of local area network (LAN) 155, which provides access to LAN database 154. LAN server 153 is in turn connected to Internet (or wide are network (WAN)) 157, which is illustrated with several servers 159 that are all accessible via Internet 157. Associated with at least one of servers 159 is repository 161, which is an extended database of information available to the world wide web that may be searched by ROK search engine 230 when a search is expanded from the local knowledge database to Internet 157.

Using the connection to network 155, a user of ROK engine 200 on data processing system 100 is provided access to resources beyond the internally stored or accessible knowledge database (e.g., LAN database 154 or repository 161 when the need for such access is required as described in greater detail below. According to the illustrative embodiment, the user does not have to be made aware that the search has been expanded to the LAN 155 or Internet 157 because ROK engine 200 handles the expanded searching in the background. Of course, access to Internet 157 must be made available to the data processing system and identified during set up of software and hardware when ROK engine 200 is being installed on data processing system 100.

Figure 1C:
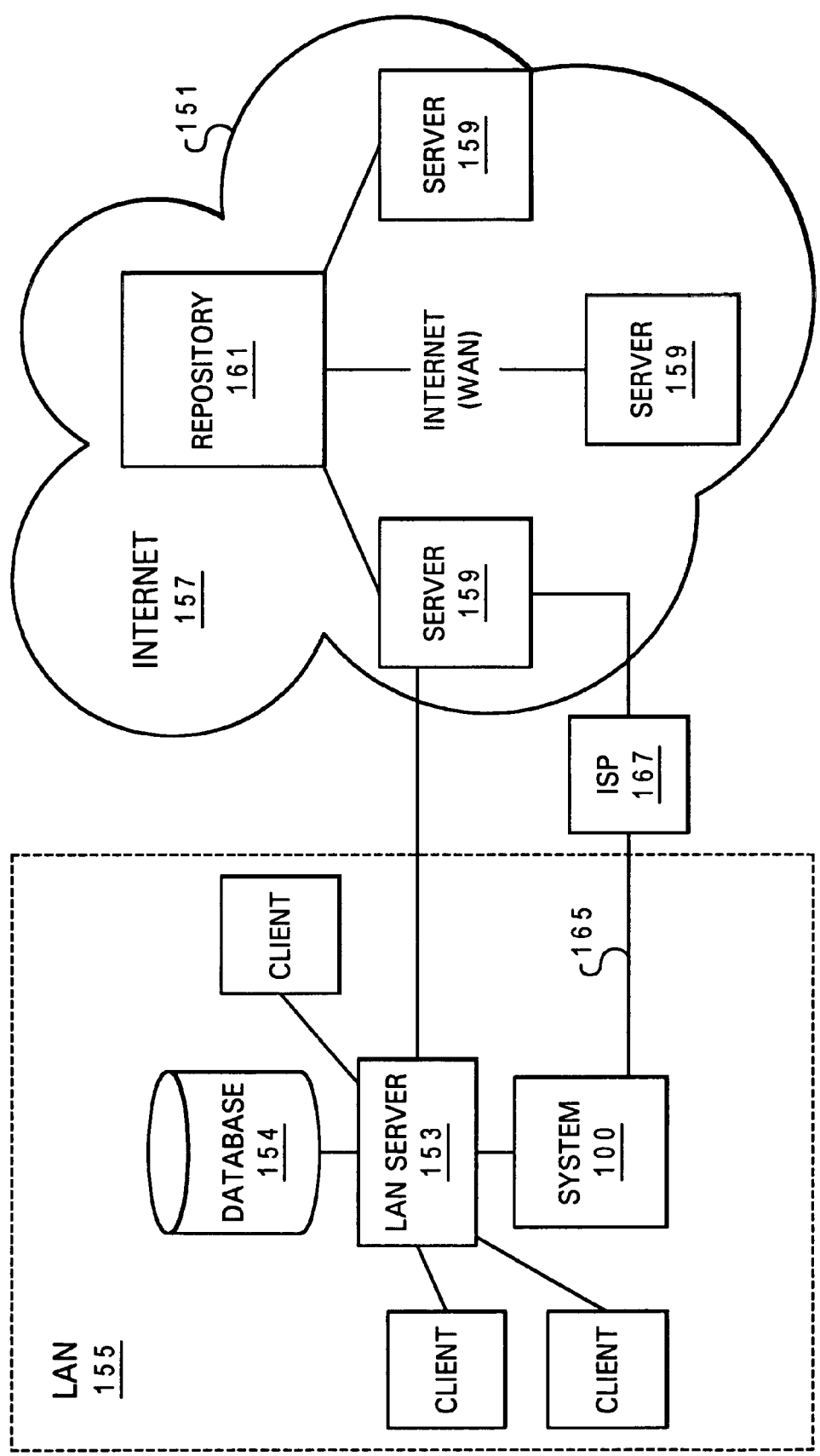
FIG. 1C illustrates a data processing system configured as a client and coupled to a network server that implements an Internet-accessible search facility operating in accordance with another embodiment of the present invention may.

Notably, as shown by connection 165, data processing system 100 may be connected directly to Internet 155 via Internet Service Provider (ISP) 167 providing high speed, direct access to repository 161 without going through LAN server 153. One extension of this embodiment is illustrated with FIG. 1C. In FIG. 1C, data processing system 130 comprises similar hardware components (not shown) as data processing system 100; however, rather than ROK engine 200, data processing system 130 includes browser application 133 (i.e., a client software), which is utilized to gain access to Internet 157. Specifically, browser application 133 is utilized to connect data processing system 130 to server 135 on which ROK engine 200 is being executed. As shown, access to Internet 157 is completed via ISP 134. Also, users of multiple other client systems 131 may also access ROK engine 200 on server 135 in addition to the user of data processing system 130. Browser application 133 accesses server 135 via the Universal Resource Locator (URL) (or web address) of server 135, and the URL is made know to all possible users of ROK engine 200.

According to this illustrative embodiment, repository 162 hosts knowledge database 164 utilized as the local search spaces of ROK search engine 230. As will become clearer in the descriptions below, in addition to a set of articles available for completing searches, knowledge database 164 comprises a set of recipes, which are continually being updated. Additionally, knowledge database 164 (and/or other sections of repository 162) also comprises user profiles (login credentials and work space), tags, weighted keywords, etc. which are utilized within various sections of the invention as described below. Notably, repository 162 may be subdivided into several storage components and/or may actually be made up of several different congruent storage facilities connected to each other. As shown, repository may be separate from or a part of the system on which ROK engine 200 is executed.

In a commercial environment, potential users of ROK engine may load or download a particular browser application provided to better interact with ROK engine. One extension of this embodiment allows local storage of incomplete user searches and user tasks. When the user completes the search or task, the completed results are then forwarded to server 135 and eventually utilized to update the knowledge database.

II. Advanced Searching Techniques

A. Context-based Searches

The invention enables the utilization of user-entered context information to enhance a search request (or query) and bring back more relevant results. ROK search engine 230 improves the precision of standard searches by prompting for and collecting contextual information from the user, such as "what the user is trying to do," and then using the contextual information along with the entered search terms to perform a much more structured search.

Referring now to FIG. 5, there is illustrated a flow chart of the general process by which a context-based search is completed in accordance with one embodiment of the invention. The process begins when the user enters a search term in ROK search engine GUI as shown at block 501. Before the search is initiated, ROK search engine 230 prompts the user to select or enter additional information identifying the work context in which the search is to be conducted as illustrated at block 503.

In one embodiment, after the user has entered the initial search information, ROK engine 200 leads the user through selection of characteristic that most closely matches the user's role and process. For example, consultants in an engagement may select a methodology, a role, and a reference architecture to be provided with complete instructions for handling entire projects. Alternatively, the user is allowed to enter natural language statements or queries such as "How may I . . . " questions to focus on lower-level, more discrete tasks. The user then submits the query to ROK search engine 230, which completes an initial local search on the knowledge database as indicated at block 505.

ROK search engine 230 completes the search of its local database and returns a result, which may or may not include sufficient hits (i.e., an article that contains the required information identified by the search terms and context information). A determination is thus made at block 507 whether sufficient hits were returned from the initial search. The determination may include some user-interaction but the present embodiment assumes that ROK engine 200 provides an automated method of determining when the result list is sufficient. The number of hits that constitutes "sufficient" may be a design parameter selected by an administrator or designer of ROK engine 200. Alternatively, this parameter may be one determined by ROK engine 200 on a search-by-search basis. As will become clearer below, ROK engine 200 includes a facility for storing prior context searches and maintaining keywords to the stored searched for quick access by later users requesting a similar search. In many cases, the additional context information selected/ entered is enough to generate a comprehensive list of the available and relevant documents/articles within the database to complete a search within that context.

The result is outputted to the user to enable the user to manipulate the articles within the result set as shown at block 509. Notably, when too much information is returned, ROK search engine GUI allows the user to scan though the returned information and delete those that may be least relevant. Then, the resulting set of articles (after user manipulation) may be saved as shown at block 511 so that the user can retrieve them at a later time without repeating the query. The process then ends as indicated at block 513.

B. Sesrches Via Keyword Selection

Returning to decision block 507, when the result does not contain sufficient hits, the search engine parses the search term (phrase) and context information into search keys, which are utilized to access a set of keywords attached (i.e., tagged) to various articles that can be retrieved as indicated at block 514. The keywords may be the same as the keys but may also include synonyms, related terms, etc. Then as shown at block 515, the search engine presents the set of known keywords to the user and allows the user to selected specific keyword that may be associated with what the user is searching for. The user-selected keywords are then utilized to directly to access the specific articles to which they are associated as shown at block 517.

1. Weighted Values for Keywords

According to one embodiment, when keywords are provided to the user for selection, ROK search engine 230 prompts the user to enter priority values for the keywords that are selected. Alternatively, ROK engine can supply the user with the recommended values for each keyword. The user may choose to override this priority and enter different values. The order in which the articles are returned is determined in part by the priority value assigned for each keyword.

In one embodiment, a sliding scale is utilized to indicate the combination of database and use priority to utilize in matching keywords. When the scale allows user input, the user is prompted with the keywords, and allowed to enter a priority value for each keyword. According to one embodiment, values may be entered for either some or all of the keywords.

C. Expanded Search Area

Returning to FIG. 5, a decision is made at block 519 whether the second search resulted in a return of sufficient articles of interest to the user. If the result contains sufficient articles, the result is outputted to the user as shown at block 509. If, however, this second search fails to return sufficient articles of interest/relevance or if no keywords are found within the context provided by the user, then, as shown at block 521, ROK search engine 230 automatically broadens the search space to include external search spaces (i.e., not directly affiliated with ROK engine or knowledge database) such as the Internet. The search is then conducted on the external search space as illustrated at block 523. At this point, a final determination is made at block 525 whether the search of the external database provided sufficient hits. When this search fails to provide sufficient hits, the ROK search engine alerts the user of the failure, creates a failure record, and then prompts the user to enter more information that may be utilized to complete a new search as indicated at block 527. When the user later finds articles that provide a solution to the search that failed, the search engine allows the user to enter the solution, which is then saved in the database. The generation of a failure record and subsequent creation of a solution to the problem is one focus of the second sequence of operations described below.

Notably, the result from the search on the external database necessarily contains articles not within the local database. These articles may be formatted differently from those within the local database and the user is forced to manipulate the articles to suite the view, etc. desired in the result. The returned articles are provided as links, which may be selected by the user. During the saving of these articles, the user may elect to save the result set as a set of links or open the articles and save them individually or as a group.

D. Combined Weighted Tag and Contextual Searching

In one embodiment, weighted tag/keyword search technology is combined with the contextual search to provide even more accurate results. Weighted tag and keyword search are useful methods for a knowledge system to assist and guide users who are searching for information. When applied to the domain of contextual and knowledge searches, the resulting mechanism allows the user to define, maintain, and use tags and values. Additionally, ROK engine 200 provides weights factors associated with specific uses of the tags on individual process or knowledge artifacts. The user is thus able to apply multiple search techniques within a single application to locate desired information and this substantially increases the chances that the user will locate the requested information.

ROK engine 200 also records the weighting factors that were used. Processing the recorded data will be a combination of automatically updating weighting factors and manually making changes such as adding additional keywords and values, or adding additional processes or knowledge items into the database.

ROK search engine 203 also allows the user to provide both textual and selected value feedback. In addition, ROK engine 200 captures some feedback automatically (such as the weight values associated with various knowledge types and keywords). Information is captured on both successful and unsuccessful searches and the weight values are continually improved. Much of the feedback information is automatically processed, reducing the amount of manual intervention that is required. Users also have the capability of submitting new processes, recipes, or knowledge articles for inclusion in the knowledge database as described below. One major benefit of this feature is that the amount of manual effort needed to maintain the knowledge database is substantially reduced. Search results are continually improved by adjusting keywords and weight factors based on each of the searches that are run. Further, utilization of ROK engine 200 fosters the building of an electronic community that both contributes to and uses the knowledge database. This enables the knowledge database to be continually improved.

III. Real-time User Updating of Knowledge Database

Thus, one primary function of the present invention is to provide a methodology for continually updating and enhancing process and knowledge databases associated with a user-interface application (i.e., ROK engine) that assists multiple users to retrieve relevant information from the databases in a format that is usable to the user. As utilized herein, process refers to the context of the knowledge and involves a series of steps. The features of the invention associated with the knowledge database ensures that the knowledge is continually updated and improved upon and that the knowledge is readily accessible to the users when they need access to it. These characteristics are different from typical search engines, which are only concerned about retrieving information (without context).

Accordingly, the invention enables the user to display both process information that provides the context of what the user is trying to do, as well as the knowledge information (i.e., formatted information associated with each step) that provides the "how" information about each step in the process. In the illustrative embodiment, the user is able to iterate back and forth between the process information and the knowledge information. That is, the user is able to move between process steps as necessary and display knowledge that is available at each step. Further, with the invention, a better understanding is obtained of the problem a user is trying to solve or task the user wants to accomplish because the invention provides both context knowledge and detailed knowledge simultaneously.

A. ROK Engine Configuration

Figure 2B:
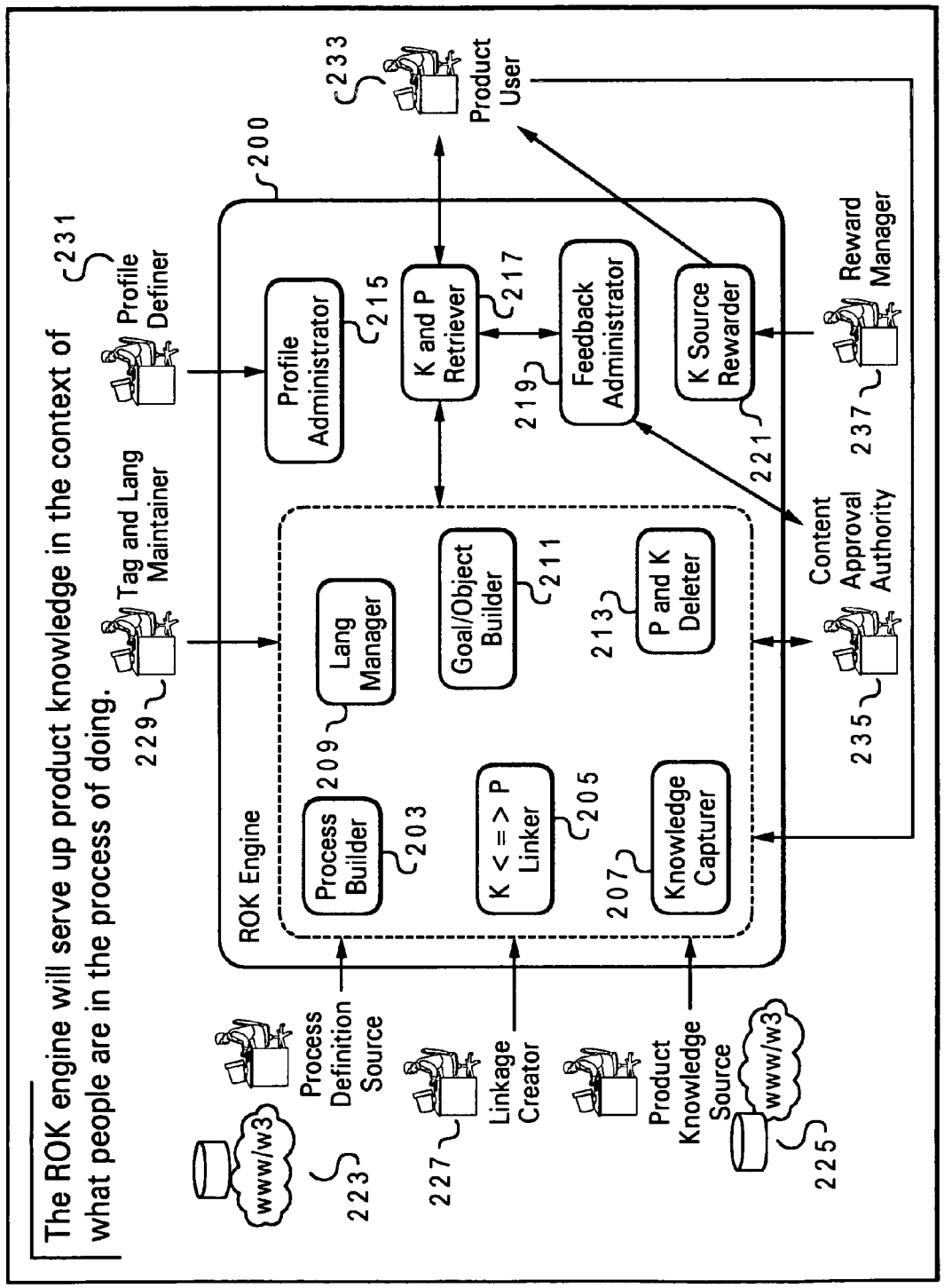
FIG. 2B is a block diagram illustrating the software modules executing on a data processing system of FIG. 1A or server of FIG. 1C that make up the engine that enables the implementation of the various functional features of one illustrative embodiment of the present invention.

Turning now to FIG. 2B, there is illustrated a more detailed block diagram representation of ROK engine 200, which in the illustrative embodiment comprises several functional software components (modules), which each performs a specific function of the invention. FIG. 2A also illustrates several of the associated external (human) inputs. For simplification, the various modules and their general functional features are provided in list form below. The functional features of the respective modules are provided by the execution of software code. Specific implementation of the features of several of the modules is described in greater detail within the description of FIGS. 4A–4I. Although the below description refers to a specific name of functional components or modules, the names are only provided to identify the module and not meant to imply any restrictions on the actually functionality provided by the module. That is, the functionality of each module of ROK engine 200 is not dependent on the specific nomenclature utilized to described the particular module, and the invention may be implemented with a ROK engine configured with different software modules that perform somewhat different functions to those described herein but which ultimately provides a functional equivalent to the general features provided by ROK engine 200. Also, it should be noted that each of the general functional blocks of FIG. 2A correspond to operational blocks that encompass the features of one of more of the modules provided in FIG. 2B. Thus, for example, interaction between knowledge capturer 207, knowledge and process retriever 217 and other modules combine to provide ROK search engine functionality of FIG. 2A.

As illustrated in FIG. 2B, software modules within ROK engine 200 include process builder 203, knowledge-to-process linker 205, knowledge capturer 207, language manager 209, goal/object builder 211 and process and knowledge deleter 213. Also illustrated within ROK engine 200 are profile administrator 215, knowledge and process retriever 217, feedback administrator 219, and knowledge source rewarder 221. In addition to the internal modules, ROK engine 200 is illustrated with several inputs (indicated by arrows) that together provide the information required to update the database and search features provided by ROK engine 200. These external inputs include processes definition source 223 and product knowledge source 225, which are both depositories available through the Internet (or world wide web). Other inputs illustrated include linkage creator 227, tag and language maintainer 229, profile definer 231, content approval authority 235 and reward manager 221. Finally, product user 233 is shown providing input to knowledge and process retriever 217. The entire process of updating the knowledge and process database(s) of ROK engine 200 occurs as a result of I/O interactions between each product user 233 and ROK engine 200.

A brief description of the functionality of several of the major software modules of ROK engine 200 is now provided.

Process builder 203 supports creation and modification of process definitions in the ROK database. Process builder 203 allows invocation of tools associated with various formats in which the processes are represented graphically. Key subcomponents of process builder 203 include a process importer and process definer. The process importer finds exact or closely matching process definitions that can be utilized to build the ROK engine process repository. The process importer scans the external sources for process definitions that match user-specified criteria and imports process definitions from the external sources. The process definer allows the end-user or authorized system administrator to define and modify process statements to be linked to knowledge components.

Knowledge capturer 207 enables the collection of technical support knowledge from various sources. Once collected, the knowledge is tagged with various classification tags, and then the tagged pointers are written for further linking to process statements and retrieval by end-users of ROK engine 200.

Knowledge to Process Linker 205 supports one of the key functions of the ROK engine, which is connecting technical support knowledge components to process statements so that knowledge can be provided in the context of the process being performed by the end user. In one embodiment, the Knowledge to Process Linker 205 operates in both user-initiated mode and auto-scan mode. In the auto-scan mode, the process or knowledge databases are periodically scanned for knowledge links and process statements that are tagged but not linked to appropriate counterparts. These orphan records are then queued for consideration by a Linkage Creator, which links tagged knowledge pointers to tagged process statements.

Language manager 209 accepts input from a number of external sources in order to build the databases of tags that are utilized to semantically structure the process statements and knowledge in the ROK engine. The language manager 209 also provides tagging rules to be set up in terms of format for valid ROK engine tags. Included within language manager is a tag definer module that allows the user to edit tags and tag values for the ROK system. Also included is a terminology builder, which is utilized by the user to specify words and phrases that are to be considered as synonyms or homonyms when conducting a search. These words/phrases may later be written to and stored within ROK database and utilized by other users when searching.

Knowledge and process retriever 217 enables the end-user to make inquiries against the engine based on the user's entered goals and objectives, which are translated into process statements and sets of tags that return the desired knowledge. Either the knowledge and process editors and/or the users may save resolved goals and objectives and have them approved for later user access as a resolved search. In one embodiment, knowledge and process retriever 217 also builds and matches interest and security profiles to filter (i.e., provide selective access to) groups of users and individual users.

Goal/Objective builder 211 enables the user to enter a goal or objective for a task of a newly entered process. The goals are higher project-level outcomes, while the objectives are more granular lower-level outcomes for a specified task Each process may include one or more tasks. Once entered, the goal and objectives are linked to process statements in order to record how processes support the work of users in ROK engine 200. The work the user is doing is matched with the knowledge the user needs to complete the job. The user is provided with access to process and knowledge tags when defining the goals and objectives and these tags are associated with matching types. According to the illustrative embodiment, once the goal is entered, ROK engine 200 searches for already resolved and saved goals and/or objectives that are similar. Otherwise the ROK retriever 217 is utilized to retrieve processes or knowledge that satisfies the goal and/or objective criteria. The returned lists of goals and objectives may be refined/customized by the user (i.e., items may be selected and/or removed from the list)

Feedback administrator 219 controls the user-entered feedback from searches conducted. Notably, both positive and negative feedback are captured from the end user and an aggregate evaluation is completed. During implementation of a search and/or update, the user is prompted to indicate when the knowledge returned satisfactorily meets the stated goal and objectives. The user is also prompted to indicate when the knowledge returned does not meet the goal and objectives. ROK engine 200 requests detailed commentary from the end user, particularly for failed searches. The user-provided feedback is compiled and process by ROK engine feedback personnel.

Knowledge and process delete 213 removes knowledge data that is considered obsolete (unused or rarely used) from the repository. The selection of data to remove is automated; however, all data identified for deletion must first be approved for deletion by a system administrator. Knowledge and process deleter 213 includes additional checks to ensures that links, etc, within the knowledge database are not orphaned by the deletion of knowledge and process data.

B. Incentive to Update Database

According to the invention, ROK engine 200 provides incentives to encourage the user to create a recipe. In order to entice users to assist in the creation of the knowledge base, knowledge source rewarder 221 provides an incentive for the users who provide adaptive knowledge. The actual incentive may take the form of a royalty payment, service utilization credit, special recognition, or other valuable consideration. In one embodiment, several possible rewards are available, and the user is prompted to select the particular reward he desires. The user must provide feedback or valid updates to the knowledge database before the user can receive the reward, and the user is thus encouraged to return to ROK engine 200 and complete each task started. In one embodiment, the information contributed by the user must first be approved as usable for other end-users before the reward is provided to the user, and more valuable rewards may be provided to users who contribute knowledge that is more often used.

C. User Security Login and Work Space Allocation

Security profile builder 215 allows ROK engine 200 to build and maintain user profiles and other information required by ROK engine 200 to track each user and assign a separate work space to each user. This feature of ROK engine 200 is primarily important when ROK engine 200 is available to users via an un-secure and un-monitored network such as the Internet. FIG. 3 provides the process of registering a new user in addition to the login process and is described below.

As introduced above, each user of ROK engine first registers for access to the engine and knowledge database and is provided a login credential by which the user can access ROK engine 200. In the described embodiment, user credential includes a unique combination of userID and password. The combination of userID and password enables the user to login to ROK engine 200 and a work space that is personalized to the user. Once the user enters the user credential, the engine opens to the screen at which the particular user's work space is displayed. The work space includes a list of any previously entered search, goal management feature that has yet to be completed as described below.

Referring now to FIG. 3, there is illustrated the process of registering new users and accessing ROK engine 200 from a web browser via the Internet. The process begins when the user enters the URL of the ROK engine as shown at block 301. The entry page of ROK engine 200 opens on the screen of the user's data processing system and prompts the user to either login as a returning user or register as a new user as shown at block 303. Returning users must enter a login credential, which may include a login ID and a password. New users have to first register to gain access to ROK engine 200. Decision block 305 illustrates the detection of the user selection. If a login credential is entered, the login credential is compared to those established in ROK engine's user profile database as shown at block 307, and a determination is made at block 309 whether the login credential matches one that is on file. If the login credential does not match, the user is presented a message that the login was incorrect as shown at block 313 and given the option to attempt to access again (i.e., entry of an incorrect login credential causes the login prompt to be automatically returned). However, as shown at block 311 entry of a matching login credential provides access to ROK search engine, which displays the workspace GUI of the particular user. Thus, the personalized search page of the particular user is displayed on screen to the user.

Returning to block 305, when the user does not have a login credential, the user selects the option to register as a new user as shown at block 315. The selection causes the register screen to open as shown at block 317 within which the user is prompted to enter required personal data. Once the user completes the entry of required personal information, the user is provided with a login credential and a new user profile is created on ROK engine as shown at block 319. Then, ROK engine 200 assigns the user a workspace to track the user access and interactions to ROK engine 200 as indicated at block 321.

D. Selecting Goals and Objectives and Generating Recipes

1. Recipes

In one embodiment, knowledge database comprises a set of "recipes," which are provided as the data within the initial search space provided by the invention. A recipe is a set of instructions for accomplishing a task with additional information to better enhance the task. The instructions within a recipe are provided as K1, K2 and K3 types of information as described in detail below. Further, the format in which the recipe is provided is one which is useful/helpful to the user (i.e., the information us structured). Notably, completion of a process may involve multiple tasks and hence each process will likely require more than one recipe to complete the process. The recipes are each associated with keywords along several different axes, for example, products, technologies, skills, roles, etc. To complete and initial search, the user is invited to search the knowledge database using a text phrase which may define a goal or an objective. The text phrase is parsed and utilized to generate keywords, which are then compared to the keywords associated with the recipes in the search space. The list of recipes from the search space that match the keywords is then presented to the user.

Alternatively, the user may be provided with the set of keywords linked to the recipes stored within the search space. The user selects one or more of these keywords, and the recipes linked to the selected keyword(s) set are retrieved. In this implementation, because only known keywords are used, the search results are guaranteed. The user can then review the returned articles (within the recipes) and determine which one (or more) of the returned recipes meets his needs. As in the contextual search described above, when none of the articles meets the needs of the user, the initial search space is expanded to a larger space, and the search in step one is repeated. The articles returned by this search will not be recipes, but will serve as a basis for the "recipe creation" function of the invention, described below.

ROK engine 200 improves the usefulness of searches by organizing knowledge according to Bloom's taxonomy, which divides content mastery into six areas—knowledge and skill, evaluation and comprehension, analysis and synthesis. In the context of creating/expanding the knowledge database, ROK engine 200 provides a sequence of steps (also referred to herein as a "recipe") to complete each goal/objective of a task. Each recipe includes three levels of information covering the six areas: (1) K1 (knowledge and skill), which represent the instructions on how to perform tasks (i.e., a cookbook or process steps); K2 (evaluation), which includes the preconditions (i.e., what is needed to accomplish the goal) and post-conditions (i.e., how to ascertain when the goal has been achieved) to determine what the user needs to know if the user wants to perform a particular task; and K3 (comprehension, analysis and synthesis), which encompasses the diagnostic steps (i.e., if the goal was not achieved, why not?) and provides information on who to contact for assistance. Each of these information groups are provided as a link within the recipe. According to the invention, "recipes," are provided as the result of a user search request. Each of the steps in this recipe is accompanied by information, which provides K1, K2 and K3 types of help.

The table below provides an example of a recipe that is generated in response to a user-entered objective of "scramble an egg". The recipe generated for this objective is as follows:

| Step | K1 Link | K2 Link | K3 Link |
| --- | --- | --- | --- |
| 1. Beat Eggs | Basic Egg Education | How to know when the eggs have been beaten well enough | What's that little red spot in the egg and what do I do about it |
| 2. Melt butter in pan | Basic Info on Pots and Pans | How to know when the fire is hot enough, How to know when the butter is the right temperature for the eggs | Oops, I burnt the butter. NOW what do I do? |
| 3. Pour eggs into pan and stir until done. | [none] | How to know when to start stirring, How to know when the eggs are ready | What to do if the eggs are too runny. |

2. Goals and Objectives

Searches within ROK engine are categorized into goals and objectives. As utilized herein, goal defines what the user is trying to accomplish and the role of the user in accomplishing the goal. More specifically, the goal defines what needs to be achieved in a broad sense. This entails questions of what is being done, how it is being done, and what is the role of the user in the process. The objective defines a more specific look at what needs to be accomplished. Creation of a recipe entails a top-level breakdown of the user-entered goal(s) or objective(s) into steps that accomplishes the tasks (or subtasks).

Figure 6:
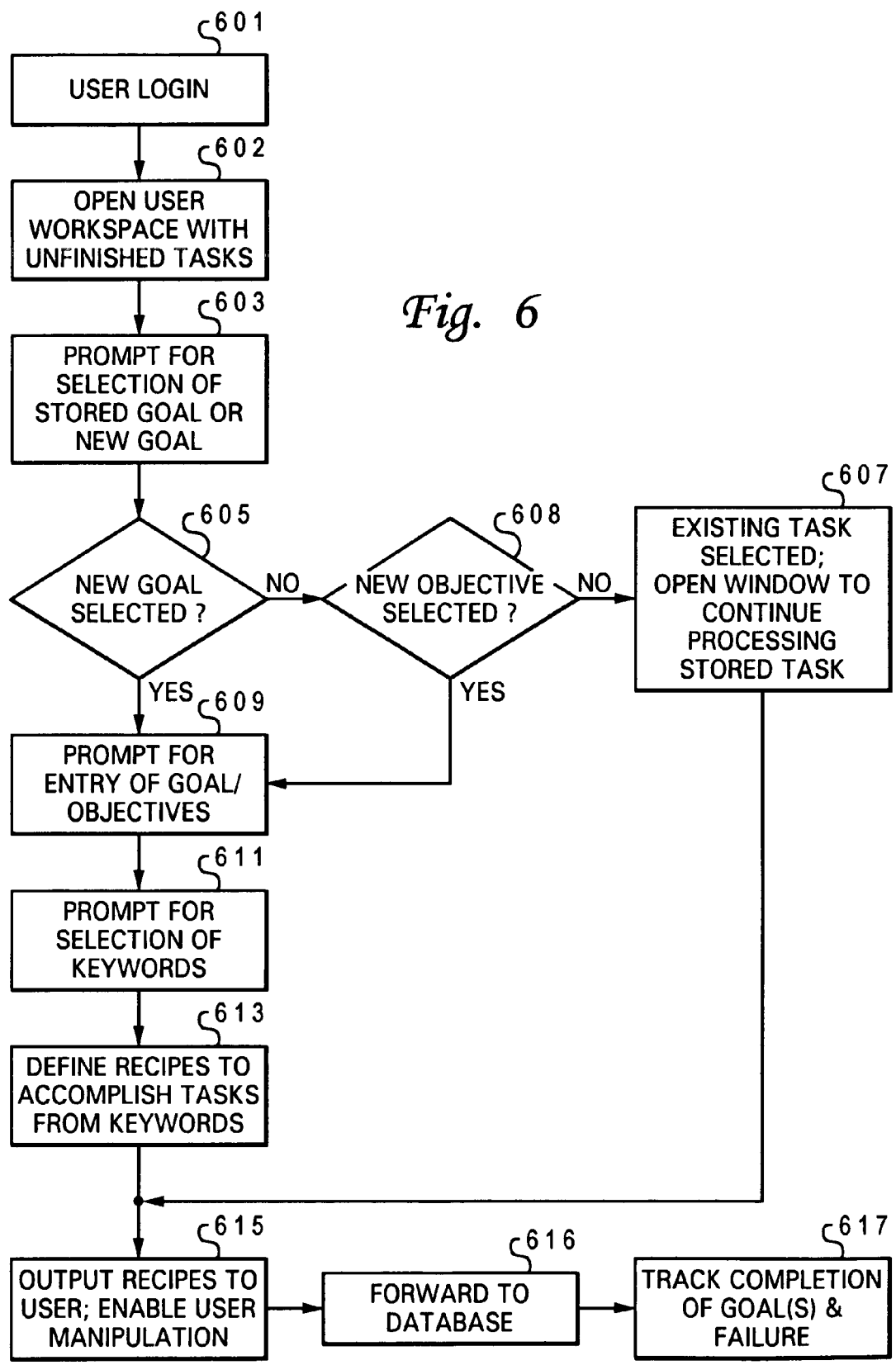
FIG. 6 is a flow chart illustrating the processes involved in updating the knowledge database of the engine based on user-entered information and selections according to one embodiment of the present invention.

FIG. 6 illustrates the process by which ROK engine 200 provides recipes in response to a user-entered request for information on how to accomplish a specific goal/objective of a task. The process begins at block 601, which illustrates the user entering his/her specific login credential (login name and password). Once the login credential is confirmed, the user is provided with a GUI of his work space in which is displayed a summary of any previous searches which the user has not yet completed as shown at block 602. ROK engine 200 prompts the user at block 603 to select an option from among: (1) create a new goal, (2) continue working on an existing goal, or (3) create a new objective. A determination is made at block 605, whether the user selects the option to create a new goal. Otherwise a next determination is made at block 608, whether a new objective is selected. If the user selects not to start a new goal or a new objective (i.e., the user selects an existing goal to work on), the GUI for working on the existing task opens up for continued user interaction as shown at block 607.

When a new goal is started, the user is prompted to enter information about the goal he is trying to accomplish as shown at block 609. In one embodiment the inquiry involves prompting the user to answer questions such as: What the user is going to do, How the user is going to do it (i.e., the process/methodology), and what the user's part/role in the process is. From block 608, if create a new objective is selected as the option, the user is prompted to enter information about the overall objective (i.e., the specific task to accomplish typically in the context of a product or technology) as shown at block 609. Following the entry of the objective, the user is prompted to select keywords associated with the tasks that perform the objectives as shown at block 611. Then, ROK engine generates and provides a set of recipes based on the selected keywords to accomplish the given tasks as illustrated within block 613. Following, at block 615, the recipes generated are outputted to the user and may be manipulated (edited) by the user. Then, the edited recipes are forwarded to the knowledge database as shown at block 616, where the completion of goals and/or failures is tracked, as indicated at block 617.

With the above user-interactive steps, ROK engine 200 provides a multi-step search protocol that us utilized is able user to build recipes, save completed objectives for other users to view, review and revise the recipes to keep them current, and save each iteration of review.

Within the context of a standard search operation, when the user enters a new search query, the user is prompted for the context within which the search is to be completed. Accordingly, the context information is received as statements about the user's goals and objectives. The goals and objectives together provide the context of the search.

E. Updating Knowledge Database with New Recipes

A key operational feature of ROK engine 200 involves the automatic storage of search results, including the search terms (keywords), tags, contextual information, user annotations, etc. within a user's work space as pending tasks or later within knowledge database as "recipes." When a user has not completed working on a result set, the user is able to store the incomplete result set within his work space on the ROK engine user database. The user may later access and work on these pending tasks by login in with the correct login credential. In addition, ROK engine 200 enables later retrieval by that user and/or other users of all stored recipes.

Notably, the invention enables a user to utilize the results of failed or incomplete searches as a starting point for providing a solution to the failed task, which solution is then included in the knowledge database so that other users can take advantage of the work of the current user. When the multi-step search protocol is able to retrieve relevant recipes, the user indicates which recipes are to be saved, and creates a title for the saved result set. Thereafter the user is able to access the result set by title. As shown in FIG. 4A, the stored result set is saved along with progress indicators, dates and times, and any annotations that the user has made. The progress indicator allows the user to see how far he has gotten through the entire result set.

F. User Workspace Guis

FIGS. 4A–4I provide a sequence of GUIs that collectively illustrates the selection of goals and objectives by a user and generation of recipes for completing the goals and objectives according to one implementation of the present invention. The user's workspace is stored on the user database of ROK engine 200 and data from the workspace are collected and displayed within the various GUIs. Thus each user views a different set of data within the GUIs although the overall layout, e.g., function buttons, etc, of the respective GUI remains the same. Once the user login credential is verified, the user's workspace opens up within goal manager GUI 401.

Goal Manager GUI 401 is utilized to keep track of where the user is with respect to all tasks, which are in some stage of completion. As shown in FIG. 4A, goal manager GUI 301 displays the current goals and objectives of the user within a to-do list. In addition to the list of current goals and objectives, goal manager GUI 401 also includes a start date and a progress column, which indicates how far along the user is in reviewing the articles in the result set returned for each task. Thus, goal manager GUI 401 alerts the user of tasks remaining to be completed.

The invention saves the results of searches for a user, allows the user to work through the results over several sessions, making changes to the result set as needed and adding annotations. The user can later explore his work space to retrieve these result sets. Accordingly, the result sets can be copied or retrieved when the user needs to solve a similar problem. The invention thus preserves the work completed by a user in organizing and processing result sets.

In one embodiment, the result set is displayed as a series of links accompanied by boxes (i.e., progress indicators) indicating the level of completion. The user can, from this display, examine the links, delete them if they are found not to be of sufficient relevance, add annotations to the links and mark the links as complete when appropriate. A progress score is computed from the number of completed articles versus the total number of articles, and the score is displayed to the user at the selection level, along with the initial date of the result set.

From goal manager GUI 401, a user has several selectable options. The user may select an existing goal to continue working on. Alternatively, the user may select a new goal or select a new objective. When a new goal is selected, the user is then prompted to provide some information about the goal, including identifying what role he will play in the achievement of the goal. FIG. 4B illustrates GUI 411 by which the information specifying the goal is entered. Once a new goal is selected, the user is then requested to customize the goal as shown in GUI 421 of FIG. 4C in order to generate a recipe.

Figure 4D:
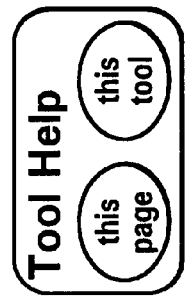
Figure 4E:
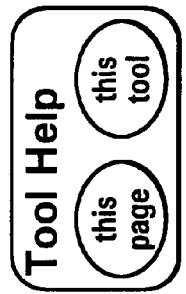
Figure 4G:
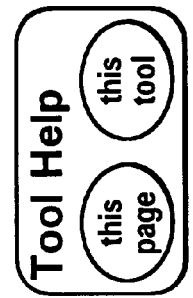

If the user selects a new objective from goal manager GUI 401 objective GUI 441 opens prompting the user to specify the objective, the objective of the search is specified utilizing Objective GUI 441 of FIG. 4E. As shown, the objective is provided as a text statement in the language in which the ROK engine is being implemented (e.g., English). With the objective defined, the statement is parsed, and a list of predefined keywords are displayed to the user within keyword selection GUI 451 of FIG. 4F. The user selects one or more of the keywords associated with the topic of interest, and ROK engine 200 then selects and outputs on tasks selection GUI 461 a list of tasks associated with the objectives and/or selected keywords for selection. Once the tasks have been selected, they are broken up into the three categories of K1, K2, and K3 information/content to create a recipe for completing the task (and subsequently achieving the goal and objectives). The list of preconditions, postconditions, etc., that are assigned to the respective categories are displayed for user-selection within recipe generation GUI 471. The user is able to customize the components of the various categories within recipe generation GUI 471. Following, ROK engine 200 displays the generated recipe within recipe GUI 481. Again, the user is provided with the option to customize the generated recipe even after the recipe is created.

Notably, the invention also uses the results of failed searches to improve the quality of the search space and later searches. User comments on both successful and failed searches are requested and recorded for later analysis by a system administrator. However, a slightly different message is presented if failure occurs after searching on predefined keywords. For example, keywords that are not matched are stored by ROK engine for later analysis. During the later analysis, these keywords are utilized to identify synonyms and common variant spellings and to generate new recipes, which might match the keywords.

G. Creation of New Recipes form Failure Response

Figure 4I:
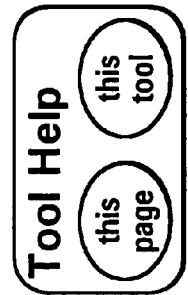

FIG. 4I illustrates failure response GUI 491, which opens when no results are found for the search (i.e., no tasks are returned or selected to generate a recipe). Failure response GUI 491 automatically pops up and prompts the user to enter additional information to attempt to resolve the reasons why the search failed and ultimately provide a solution in the form of additional recipes or keywords, etc.

As an extension of the search feature described above, when the multi-step search protocol described above does not retrieve relevant recipes, a broader search space is searched for potentially relevant articles. These are presented to the user in a set, which may be saved as a set of links. The user can perform new searches to increase the number of articles in the set, remove links for irrelevant articles, classify the remaining articles as to their K1, K2 and K3 content, and can split articles into smaller chunks. As the user works he will eventually learn the steps that need to be performed to attain the goal or perform the task, and these steps will provide the basis for the recipe. The recipe itself may be augmented by the links that the user has already selected and classified. When the recipe is completed, it is associated to the keywords that the user selects as appropriate. The recipe is then added to the knowledge database for the benefit of other users.

Returning to FIG. 4A, goal manager GUI 401 provides one option that allows the user to delete a goal from the displayed list. According to the invention, whenever a goal is to be deleted from the list (without being completed), ROK engine initiates an "exit interview" of the user. When the delete option is selected, the user is prompted to enter reasons why the goal has been deleted, and the reasons entered by the user are archived along with the goal and analyzed by system personnel. This feature is particularly relevant in failure situations (i.e., where the project/task did not meet the user's needs). The information entered by the user is utilized by system personnel (e.g., an analyst or administrator) to update/improve the database recipes. The history tied to the user's profile will show all completed and discarded goals and objectives and provide the system personnel with access to the exit interview responses.

The invention provides various techniques to present context-based information to a user trying to perform specific tasks or meet specific goals. For some tasks or goals, the user may find that no information is available (or that the available information is unstructured). ROK engine 200 provides the user with a mechanism for organizing information into recipes so that other users may take advantage of the efforts of the user.

IV. Automated Updating and Maintenance of Database

The invention provides the necessary features to support an automated electronic updating and maintaining of any searchable database that is utilized to provide users with relevant information in response to a user requested search. The part of the updating and maintenance feature of the invention is clearly described above in Section III, in which ROK engine enables a user to generate new recipes (from old recipes and or articles retrieved from an external source) and add the new recipes to the knowledge database. As provided above, adding the new recipes may entail a review by ROK system administrator to ensure the recipe meets with standards required for the recipe to be useful to other users.

As also described above, occasionally the system administrator may remove a recipe from the database when that recipe is not being utilized. This process requires a manual effort and a search through the large amounts of data on the knowledge database.

The present invention thus provides a point system for automating the removal of information (articles, recipes, etc.) from a database when those articles are not being utilized by users of the database. Notably, the implementation of this point system is applicable to any database of information. For simplicity, the point system is described herein within the context of a knowledge database associated with ROK engine 200 and storing a plurality of recipes that may be retrieved by users of ROK engine 200. According to the implementation and as illustrated by FIG. 7A, in addition to associated keywords and tags 777, each recipe 773 within knowledge database 771 is assigned a value parameter 775.

Value parameter 775 is linked to (or associated with) its respective recipe 773 and includes a set of bits in which a point value of the particular recipe 773 is stored. For example, in one embodiment, the point parameter may hold a value from 0 to 15 (i.e., 4 bits), and that value may be adjusted up or down between 0 and 15 based on the usage of the recipe and/or the point values selected by users of the recipe, as will become clearer below. According to the invention, a minimum threshold value of the value parameter is established for all the recipes within the database. The minimum threshold value represents the point value that the recipe has to maintain over a pre-determined time period (also a system parameter) for the recipe to be considered useful and to be kept within the database.

Figure 7B:
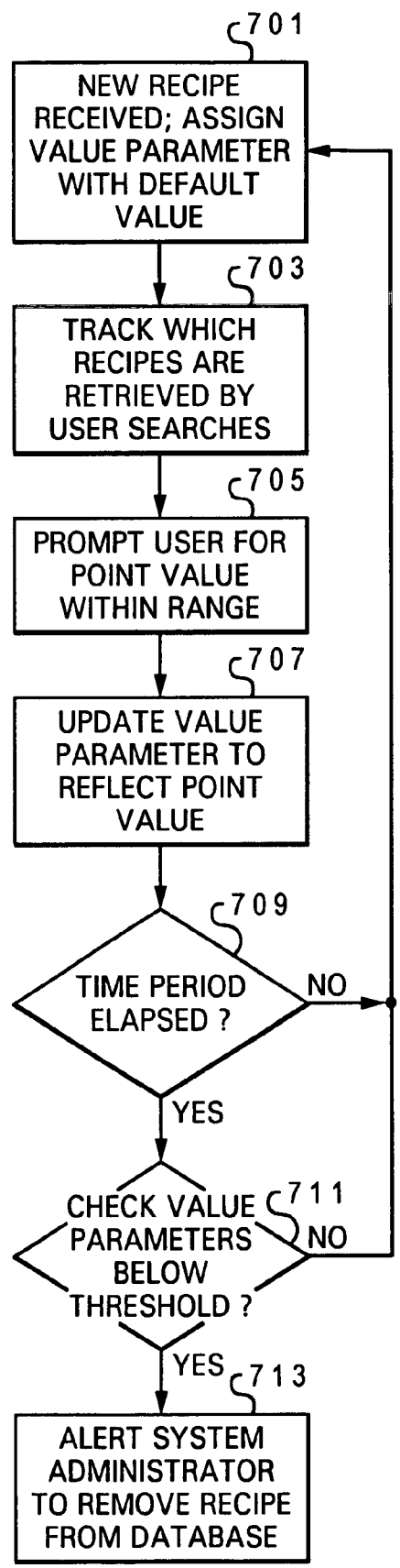
FIG. 7B is a flow chart of the process by which a database is dynamically maintained utilizing a point system implementation according to one embodiment of the invention.

Referring now to FIG. 7B, according to the embodiment described herein, and as illustrated by block 701, when a new recipe is first stored within the knowledge database, the recipe is provided a value parameter and is assigned a default value. Of course, receipt of a new recipe may occur at any point in the illustrated process, and the specific location of this block at the beginning of the process steps is not meant to suggest that the other steps only occur when a new recipe is received. The default value may be 0 or another value that is above at the minimum threshold. Since deletion of a recipe occurs only after sufficient time in which most useful recipes are expected to be retrieved at least once, the present embodiment assumes a default point value below the minimum threshold value. User searches are monitored by the system and recipes retrieved by these searches are tracked as shown at block 703. According to the illustrative embodiment, for each search which retrieves at least one recipe, a prompt is generated to request the user to rate the usefulness of the particular recipe as shown at block 705. The user is able to select a point value from within a range of values (e.g., 0 to 5) that represent not useful at one end (i.e., 0) to very useful at the next end (i.e., 5). When the user selection is completed, the parameter value of the recipe is updated to reflect the point value selected as shown at block 707.

Updating the parameter value may entail averaging the user-selected point value with the previous point value within the value parameter, adding the selected point value to previous value, etc. Any method of updating the value parameter may be implemented so long as the time average of the point value within the value parameter accurately informs the system when a recipe is below the minimum threshold value desired for "useful" recipes.

In one embodiment, the point value of the recipe is incremented by one each time the recipe is utilized within a time period up to a maximum value. Accordingly, this embodiment assigns points for actual usage of the recipe. A combination of this embodiment with the previous would enable a tracking of not only how often the recipe is utilized but also how effective the users believe the recipe is in aiding them to achieve their stated goals or objectives.

Returning now to FIG. 7B, a determination is made at block 709 whether the time period has elapsed. When the time period has elapsed, a global check is made of the value parameters of the recipes and a determination made as shown at block 711 whether any value parameter is below the minimum threshold value. When a value parameter is below the minimum threshold value, the associated recipe is removed from the database as shown at block 713. In the illustrative embodiment, deletion occurs automatically. In another embodiment, recipes, whose point values fall below the minimum threshold value are first marked for deletion from the database. Then, the recipes marked for deletion are first sent to a system personnel, who may chose to keep particular ones of the recipes by updating/increasing their respective point values.

According to the illustrative embodiment, the incentive and reward system of ROK engine 200 (described above) is tied to the point value of the recipe. When a recipe acquires more than a maximum threshold value, the system automatically identifies the user that created the recipe and provides that user with a reward. In this manner, users of ROK engine are encouraged to spend more time creating useful recipes that will be utilized by many other users. The quality of the recipes generated by this additional incentive is therefore substantially improved.

V. Additional Considerations and Benefits

ROK engine 200 supports the following functional requirements: (1) serving up product technical support knowledge in the context of the solution production process, as well as viewing, creation and modification of process descriptions in relation to specified goals; (2) refreshing knowledge with innovations and answers to problems that occur during the process of delivering business solutions (Adaptive Knowledge); (3) capturing feedback on the usage and value of knowledge (Return on Knowledge); (4) selectively filtering of content based on various tagging schemes and security profile (K-tag Filter); and (5) providing access to content via any number of applications and user interfaces (ROK API). Further, ROK engine 200 enables reconciliation of views on process and other tags.

Other features of the invention includes importing/defining processes, the ability to run offline (a least for metadata search) and viewing of subset of knowledge and the ability to package the external offline portion and leave it with a customer. In one implementation, the ROK engine provides a generic capability that can be interfaced to other applications as a standalone configuration or a utility. The ROK engine further serves up product knowledge in the context of what people actually do. That is, the invention dynamically expands the body of available knowledge through real-time experience capture. The invention ensures that accumulated knowledge may be retained as an asset and enables the packaging of knowledge once for delivery through all its channels.

The invention also provides a tool for administering continuous updates to a set of knowledge, both by automated tools and users of the search mechanisms. Utilization of this tool substantially reduces the requirements for system administrators to define the necessary roles, design, and implement their own administration system, or allow unmonitored updates to the knowledge database. This aspect is particularly important in an environment where multiple users submit processes and detailed knowledge articles to a common database. Examples include review of tags and value definitions, synonyms/homonyms, and checks for related or duplicated process or knowledge artifacts. Accordingly, the invention resolves the need for a system of authorizations and reviews for the information to be defined and enforced. ROK engine 202 provides the mechanisms necessary to author, review, and eventually publish or reject user-provided process and knowledge information. ROK engine 200 further allows for (optional) review of changes that are suggested by an automated modification system based on feedback from users of the search engine.

Additional benefits seen by implementation of the invention includes the ability to: (1) provide a solution that improves productivity of putting our software into customer production use providing knowledge retrieval based on what a user is trying to do (e.g., an interactive redbook); (2) provide a mechanism to the user community for developing and contributing new knowledge (self-sustaining) and maintaining existing knowledge (up-to-date); (3) provide feedback to managers and others on effectiveness of knowledge (high return on investment) and the mechanism of retrieval; (4) tailor search results to the person using the system; (3) provide an engine that can be used via API by a variety of technical support channels (constituency-independent).

The invention allows the user to provide both textual and selected value feedback. In addition the system captures some feedback automatically (such as the weight values associated with various knowledge types and keywords). Information is captured on both successful and unsuccessful searches. Much of the feedback information is automatically processed, reducing the amount of manual intervention that is required. Users also have the capability of submitting new processes, recipes, or knowledge articles for inclusion in the knowledge base. This approach reduces the amount of manual effort needed to maintain the knowledge. Search results are continually improved by adjusting keywords, and weight factors based on searches that are run. It also fosters the building of a electronic community that both contributes to the knowledge, as well as uses it. This approach automates the process and provides algorithms, which result in improved weight values.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for real-time automated maintenance of an electronic database, said method comprising:

providing a value parameter associated with each individual data component within said database;

tracking a use history of each of said individual data components via said value parameter;

assigning a set number of points to a data component each time said component is retrieved by a user-entered request for data, wherein said set number of points is utilized to update a total within said value parameter;

wherein at least one of the individual data components is a recipe that includes processes for completion of a user-defined goal and objective, said method further comprising:

triggering a reward-issuing feature that results in a user receiving a reward for generating a new recipe that is accepted for publication within said database;

assigning a point to a recipe each time said recipe is utilized by a user;

responsive to a recipe being utilized more than a maximum threshold number of times, providing an additional reward to the user who generated said recipe; and dynamically determining when a particular component within said database fails to accumulate at least a minimum threshold number of points over a predetermined time period; and removing said particular component from said database when said component fails to accumulate the minimum threshold number of points.

2. The method of claim 1, wherein:

said providing step comprises linking said value parameter to the particular component; and said assigning step includes updating said value parameter each time said particular component is retrieved.

3. The method of claim 1, further comprising:

displaying to a user a range of points that may be selectively assigned to a retrieved component, said range of points representing a usefulness of the component to the user and ranging from no use to very useful;

enabling said user to select a point value from within said range of points to assign to said retrieved component; and updating a point parameter of said retrieved component on said database with said point value selected.

4. The method of claim 3, further comprising prompting said user to select said point value, wherein if said user fails to select a point value a pre-set average value is assigned.

5. The method of claim 1, further comprising:

enabling a user to generate new components by interacting with a return on knowledge facility associated with said database;

adding said new component to said database; and assigning a default point value to said new component when said new component is added.

6. The method of claim 5, wherein responsive to a point value of a component that was added by a particular user surpassing a maximum threshold value, providing said particular user with an incentive for adding said component to said database.

7. The method of claim 1, wherein said removing step includes:

identifying said data component to a system administrator as being selected for deletion; and enabling said system administrator to override a deletion of said data component by adjusting a point value of said value parameter.

8. The method of claim 1, removing step further comprising:

responsive to a recipe being utilized less than a minimum threshold number over a pre-determined period of time, scheduling said recipe for deletion from said knowledge database.

9. A database maintenance facility of a data processing system for providing automatic maintenance of updated and useful data within a database, said facility comprising:

means for providing a value parameter associated with each individual data component within said database;

means for tracking a use history of each of said individual data components via said value parameter;

means for assigning a set number of points to a data component each time said component is retrieved by a user-entered request for data, wherein said set number of points is utilized to update a total within said value parameter;

wherein at least one of said data component is a recipe that includes processes for completion of a user-defined goal and objective, said facility further comprising:

means for triggering a reward-issuing feature that results in a user receiving a reward for generating a new recipe that is accepted for publication within said database;

means for assigning a point to a recipe each time said recipe is utilized by a user;

means, responsive to a recipe being utilized more than a maximum threshold number of times, for providing an additional reward to the user who generated said recipe; and means, responsive to a recipe being utilized less than a minimum threshold number over a pre-determined period of time. for scheduling said recipe for deletion from said database.

10. The database maintenance facility of claim 9, wherein:

said providing means comprises means for linking said value parameter to the particular component; and said assigning means includes means for updating said value parameter each time said particular component is retrieved.

11. The database maintenance facility of claim 9, further comprising:

means for displaying to a user a range of points that may be selectively assigned to a retrieved component, said range of points representing a usefulness of the component to the user and ranging from no use to very useful;

means for enabling said user to select a point value from within said range of points to assign to said retrieved component; and means for updating said point parameter of said retrieved component on said knowledge database with said point value selected.

12. The database maintenance facility of claim 11, further comprising means for prompting said user to select said point value, wherein if said user fails to select a point value a pre-set average value is assigned.

13. The database maintenance facility of claim 9, further comprising:

means for enabling a user to generate a new component by interacting with a return on knowledge facility associated with said database;

means for adding said new component to said database; and means for assigning a default point value to said new component when said new component is added.

14. The database maintenance facility of claim 13, further comprising:

means for dynamically determining when a particular component within said database fails to accumulate at least a minimum threshold number of points over a predetermined time period;

means for identifying said data component to a system administrator as being selected for deletion within a preset time period;

means for enabling said system administrator to override a deletion of said data component by adjusting a point value of said value parameter;

means for automatically deleting said particular component from said database when said system administrator does not override said deletion within the preset time period; and means, responsive to a point value of a component that was added by a particular user surpassing a maximum threshold value, for providing said particular user with an incentive for adding said component to said database.

15. A computer program product comprising:

a tangible computer readable medium; and program code on said computer readable medium for real-time automated maintenance of an electronic database, said program code including code for:

providing a value parameter associated with each individual data component within said database;

tracking use histoiy of each of said individual data components via said value parameter;

assigning a set number of points to a data component each time said component is retrieved by a user-entered request for data, wherein said set number of points is utilized to update a total within said value parameter;

wherein when said data component is a recipe that includes processes for completion of a user-defined goal and objective, said program code further comprising code for:

triggering a reward-issuing feature that results in a user receiving a reward for generating a new recipe that is accepted for publication within said database;

assigning a point to a recipe each time said recipe is utilized by a user;

responsive to a recipe being utilized more than a maximum threshold number of times, providing an additional reward to the user who generated said recipe; and responsive to a recipe being utilized less than a minimum threshold number over a pre-determined period of time, scheduling said recipe for deletion from said database.

16. The computer program product of claim 15, wherein:
said providing program code includes code for linking said value parameter to the particular component; and
said assigning program code includes code for updating said value parameter each time said particular component is retrieved.

17. The computer program product of claim 15, further comprising program code for:
displaying to a user a range of points that may be selectively assigned to a retrieved component, said range of points representing a usefulness of the component to the user and ranging from no use to very useful;
enabling said user to select a point value from within said range of points to assign to said retrieved component; and
updating said point parameter of said retrieved component on said database with said point value selected.

18. The computer program product of claim 15, further comprising program code for prompting said user to select said point value, wherein if said user fails to select a point value a pre-set average value is assigned.

19. The computer program product of claim 15, further comprising program code for:
enabling a user to generate new components by interacting with a return on knowledge facility associated with said database;
adding said new component to said database; and
assigning a default point value to said new component when said new component is added.

20. The computer program code of claim 19, further comprising program code for:
dynamically determining when a particular component within said database fails to accumulate at least a minimum threshold number of points over a predetermined time period;
identifying said data component to a system administrator as being selected for deletion;
enabling said system administrator to override a deletion of said data component by adjusting a point value of said value parameter;
when said system administrator does not override said deletion, removing said particular component from said database; and
responsive to a point value of a component that was added by a particular user surpassing a maximum threshold value, providing said particular user with an incentive for adding said component to said database.

* * * * *